United States Patent
Maguire et al.

(10) Patent No.: US 7,898,391 B2
(45) Date of Patent: Mar. 1, 2011

(54) MULTI-READER COORDINATION IN RFID SYSTEM

(75) Inventors: Yael Gregory Maguire, Cambridge, MA (US); Matthew Stephen Reynolds, Medford, MA (US); Ravikanth Srinivasa Pappu, Cambridge, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1286 days.

(21) Appl. No.: 11/171,443

(22) Filed: Jul. 1, 2005

(65) Prior Publication Data

US 2007/0001813 A1    Jan. 4, 2007

(51) Int. Cl.
    *H04Q 5/22* (2006.01)
(52) U.S. Cl. ...................................... 340/10.2
(58) Field of Classification Search ............... 340/10.2, 340/572.1, 572.4, 10.1, 10.3, 10.31; 342/44; 370/328
    See application file for complete search history.

(56) References Cited

U.S. PATENT DOCUMENTS

| | | | |
|---|---|---|---|
| 5,649,295 A | 7/1997 | Shober et al. | |
| 5,986,570 A | 11/1999 | Black | |
| 6,340,932 B1 | 1/2002 | Rodgers et al. | |
| 6,377,203 B1 | 4/2002 | Doany | |
| 6,476,756 B2 | 11/2002 | Landt | |
| 6,486,769 B1 | 11/2002 | McLean | |
| 7,026,935 B2 | 4/2006 | Diorio et al. | |
| 7,345,575 B2 | 3/2008 | Tuttle et al. | |
| 7,405,656 B2 | 7/2008 | Olsen | |
| 7,411,921 B2* | 8/2008 | Strong et al. ................. 370/328 |
| 2002/0175805 A9* | 11/2002 | Armstrong et al. ........ 340/10.31 |
| 2005/0088284 A1* | 4/2005 | Zai et al. ....................... 340/10.2 |
| 2005/0248456 A1 | 11/2005 | Britton et al. | |
| 2006/0012521 A1 | 1/2006 | Small | |
| 2006/0022800 A1 | 2/2006 | Krishna et al. | |
| 2006/0076401 A1 | 4/2006 | Frerking | |
| 2006/0114104 A1* | 6/2006 | Scaramozzino ............. 340/10.2 |

OTHER PUBLICATIONS

ThingMagic "Generation 2: A User Guide," Version 1.0, Apr. 2005.
International Search Report and Written Opinion mailed Sep. 25, 2007 in International Application No. PCT/US2006/019680.
Written Opinion, PCT/US06/19680, date of mailing, Sep. 25, 2007.
International Search Report, PCT/US06/19680, date of mailing May 19, 2006.

* cited by examiner

*Primary Examiner* — Brian A Zimmerman
*Assistant Examiner* — Nabil H Syed
(74) *Attorney, Agent, or Firm* — Foley & Lardner LLP; John D. Lanza (57) ABSTRACT

A method of operating a plurality of Radio Frequency Identification (RFID) readers includes operating the readers according to a spatial-division and time-division synchronization schedule. Each reader may be associated with a reader group, and the schedule may specify a duration of time that all of the readers in a group may be active. Readers in different reader groups may be scheduled independent of readers in other reader groups.

22 Claims, 6 Drawing Sheets

MULTI-READER COORDINATION IN RFID SYSTEM

FIELD OF THE INVENTION

This invention relates to Radio Frequency Identification (RFID) systems. More particularly, this invention relates to multi-reader coordination and scheduling in RFID systems.

BRIEF DESCRIPTION OF THE DRAWINGS

The invention is better understood by reading the following detailed description with reference to the accompanying drawings in which.

DESCRIPTION OF PRESENTLY PREFERRED EXEMPLARY EMBODIMENTS

Background and Overview

RFID systems have become ubiquitous, and are used in many different sorts of applications. In basic operation, an RFID reader/scanning antenna emits an RF signal in a particular frequency range. The RF (Radio Frequency) radiation does two things: it provides a means of communicating with a transponder tag (an RFID chip), and (in the case of passive RFID tags) it provides the RFID tag with the power to communicate.

The terms "antenna" and "reader" are used interchangeably herein to mean a device or mechanism which broadcasts RF energy to allow an RFID tag to be read.

Scanning antennas, or readers, may be permanently fixed to a surface or they may be handheld or vehicle mounted. When an RFID tag passes through the field of a scanning antenna, the tag detects an activation signal from the antenna. That signal effectively wakes up the RFID chip in the tag. The chip then transmits information stored in its memory to be picked up by the scanning antenna.

An RFID tag may be of one of three types. Active RFID tags have their own power source and are capable of actively transmitting, while passive RFID tags, as noted above, derive their power from the RF radiation emitted by RFID readers. A third type of tags—semi-passive tags—have a battery, but only reflect power from the reader.

RFID readers may be used in installations that have multiple such readers and antennas in different locations. For example, a warehouse may have RFID readers/antennas at each dock door and at various locations throughout the warehouse, or a retail store may have multiple check-out stations, each having an RFID reader. If multiple readers broadcast at the same time, so-called "reader collision" may occur. Reader collision occurs when the signals from two or more readers overlap in time within the same or a proximate frequency band. The greater the number of readers, the more likely reader collision is to occur. Since tags usually make use of broadband receivers, overlapping reader signals within the same frequency band are usually misinterpreted, so a tag is generally unable to respond to simultaneous queries. In the case of a multi-reader installation without synchronization, since the broadcasts can and likely will overlap it will not be possible to read RFID tags reliably. Accordingly, multiple readers need to be synchronized to avoid this "reader collision" problem.

Figure 1:
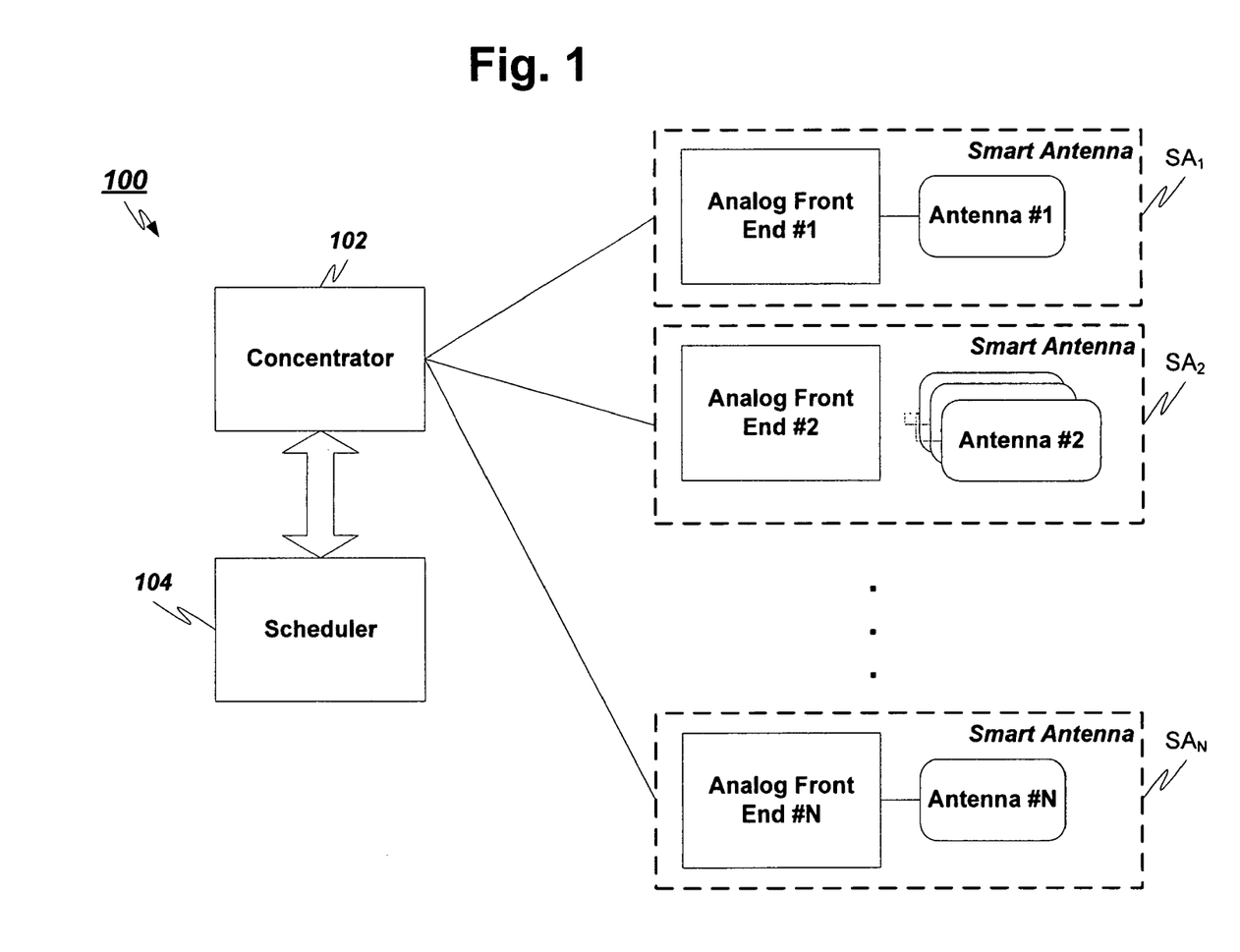
FIG. 1 shows a system according to embodiments of the present invention.

FIG. 1 shows a system (generally denoted 100) according to embodiments of the present invention. A number of smart antennas (denoted $SA_1$ to $SA_N$) are connected to a concentrator 102. As used herein, a read point (RP) or smart antenna (SA) is defined to be the end-point antenna of a reader system, containing an Analog Front End (AFE) and baseband processing according to embodiments of the present invention. An AFE receives raw analog signals and provides them to other circuitry for processing. A scheduler 104 connects to the concentrator 102 to obtain information therefrom and to provide scheduling and other information thereto. The scheduler may be implemented as software running on any standard computer system and, although shown apart from the concentrator, may be collocated therewith. Although only one concentrator 102 is shown in the drawing, those skilled in the art will know and understand that multiple concentrators may be used.

In some RFID systems according to embodiments of the present invention a single AFE may be multiplexed across antennas. This is reflected in FIG. 1 where $SA_2$ is shown as having more than one antenna. The time to switch between antennas is limited by:

the antenna hardware switch time, $T_{has}$, generally on the order of tens of nanoseconds.

the software switch time, $T_{sas}$, generally on the order of 10 microseconds to 5 milliseconds, depending on the scheduling algorithm used and the hardware on which the software is run.

Figure 2:
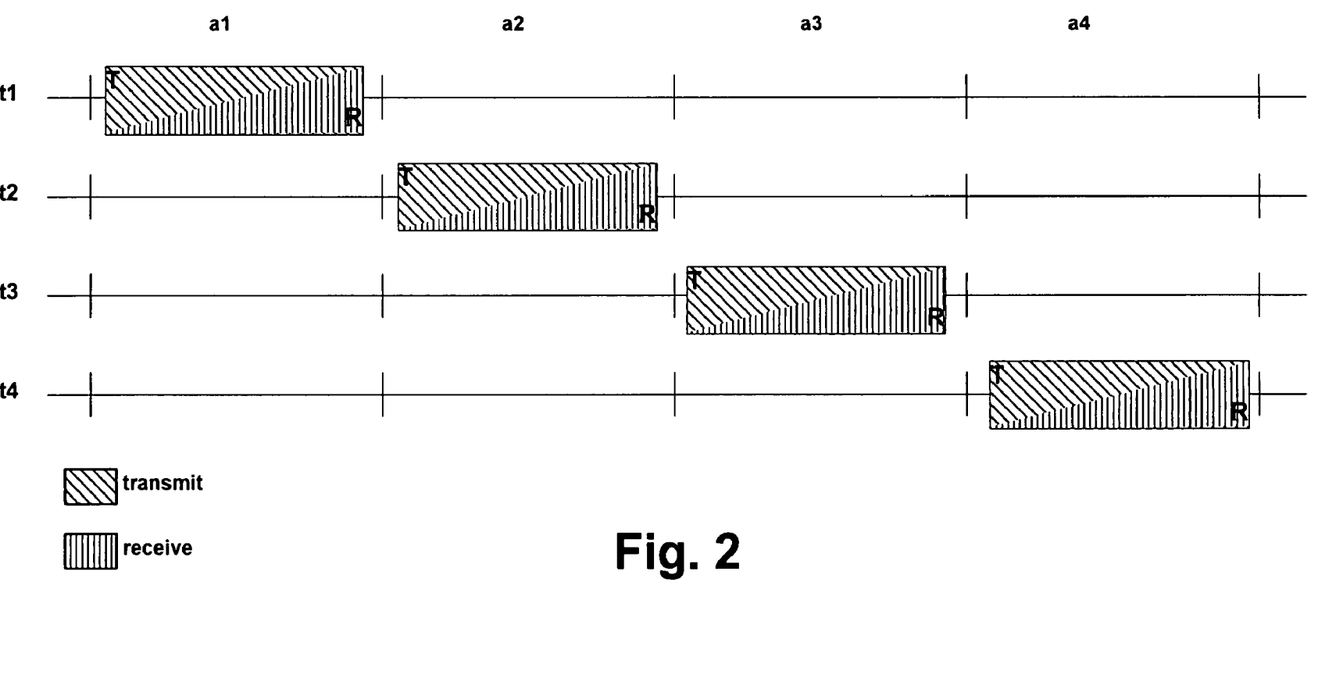
FIGS. 2, 3 and 6 depict various scheduling schemes according to embodiments of the present invention.

Antenna arbitration/scheduling in such systems (single AFE, multiple antennas) is generally time division multiple access (TDMA), in which system run time is divided into time slots, one slot for each antenna, shown in a matrix format of antenna versus time slot in FIG. 2. These time slots may be equal in length, or unequal in length, depending on factors such as the expected number of tags to be read from each antenna. As shown in FIG. 2, the TDMA model may be represented as a matrix, where $a_i$ represents an antenna while $t_i$ represents a time slot. By definition, using this TDMA model, antennas will not overlap in time. This matrix is always diagonal.

As shown in FIG. 2, in time slot $t_1$ antenna $a_1$ starts transmitting and receiving. After antenna $a_1$ is done, at time $t_2$, antenna $a_2$ begins transmitting and receiving, and so forth. After the last antenna is done, the first one begins again, and so on.

While appropriate for a single AFE multiplexed across multiple antennas, TDMA systems using a diagonal time slot matrix such as that just described have a number of problems, not least of which is that, if there are N readers, there are N time slots and each reader is only active 1/N of the time. In a large system with over fifty or one hundred readers, this high degree of effective "downtime" for any given reader is generally unacceptable. Spatial separation (SDMA—Spatial Division Multiple Access) may make this group size smaller, but choosing this group can be complicated by multipath in an environment).

In some embodiments of the present invention, there may be an AFE for each antenna—N AFEs, one for each of N antennas (one-to-one). With this architecture, the invention provides multiple models for reader-to-tag communication:

Central network coordination with no RF based synchronization—SISO (Single Input Single Output) Type I Central network coordination with time-based, RF-informed synchronization—SISO Type II MISO (Multiple Input Single Output)—Central network coordination with RF carrier and tag synchronization for reception MIMO (Multiple Input Multiple Output)—Central network coordination with RF carrier and tag synchronization for transmission and reception In each of these techniques, with reference to FIG. 1, the scheduler 104 may provide a schedule to the SAs via the concentrator 102.

SISO Type I—Central Network Coordination with No RF Synchronization

In these embodiments of the present invention, the role of network coordination is to sequence the SAs and to specify a duration of time that each of the SAs will be active. Given setup time and network latency in synchronization message transport, the read points should preferably be scheduled to be slightly overlapped in time (for example, for half the variance in timing messages expected from the networked timing system) to make the most efficient use of time. This type of system performs best in a closed network—since the setup time could be measured and would be small, but the network latency should be as close to constant as possible to ensure that the overlap periods are consistent.

SISO Type II—Central Network Coordination with RF Power (Time-Based) Synchronization In these embodiments of the present invention, the role of network coordination (provided by the scheduler via the concentrator) is still to sequence the SAs in terms of their position within a given transmission sequence, but no longer to micromanage the timing initiation of each of the SAs. Each SA may be associated with a reader group which can be used for local synchronization as well as for reader policy implementation.

In some embodiments of the present invention, all SAs that belong to each reader group receive the same information, e.g.:

groupId=$G_k$
antennaList=$\{a_1, a_2, a_3, \ldots, a_m\}$
protocolList=$\{\{p_{11}, p_{12} \ldots\}, \{p_{21}, p_{22}, \ldots\} \ldots\}$
timeOutList=$\{t_{11}, \{t_{21}, t_{22}, \ldots\}, t_3, \ldots\}$
startSeed=$S_0$ Here, GroupId represents an identity of the group (in this case $G_k$), and antennaList is a list of the antennas in the same group (in this case $\{a_1, a_2, a_3, \ldots a_m\}$). As noted, all the antennas in group $G_k$ get the same information.

As is well known in the art, there are a number of protocols available for RFID systems. Presently ThingMagic, Inc. of Cambridge, Mass., provides RFID readers that are capable of supporting multiple protocols. E.g., ThingMagic's Mercury 3 reader is capable of reading both High-Frequency and Ultra High-Frequency RFID tags simultaneously and supports ISO15693, ISO18000-B and EPC Class 1 protocols, and ThingMagic's Mercury 4 reader is capable of reading any tag, including ISO, EPC Class 0, EPC Class 1 (and EPC Generation 2, when available). The protocolList given to each antenna in a group lists the various protocols that it (and each other antennas in the group) should use within each scheduled operation. For example, protocolList=$\{\{p_{11}, p_{12} \ldots\}, \{p_{21}, p_{22}, \ldots\} \ldots\}$ means that antenna $a_{11}$ should operate at protocol $p_{11}$ and then $p_{12}$ and so on; antenna $a_{12}$ should operate a protocol $p_{21}$ and then $p_{22}$ and so on. A protocol list should contain a sub-list for each antenna in the group. Along with the protocolList is a timeOutList, in this example, $\{t_{11}, \{t_{21}, t_{22}, \ldots\}, t_3, \ldots\}$. The timeOutList provides the time duration for which each antenna should operate (read) in each corresponding protocol. Since tags generally communicate using only one protocol, and many business environments involve the use of many different types of tags, allowing the protocol to be used to be scheduled provides a valuable feature to a scheduling operation.

Tags are generally too easily confused to support trying to read multiple protocols simultaneously. Use of a protocol list allows tags to be operated in a further TDMA fashion. In addition, a protocol list allows readers to be configured to spend more time on protocols known to be present.

This information may be individually sent to each SA or broadcast to all devices on a concentrator subnet, e.g., via a broadcast or multicast message. The group id may designate a subset of the total number of SAs connected to a concentrator or a set of SAs from multiple concentrators. With this information, the first antenna starts on the protocol list it is supposed to start with, while the next antenna on the list will continue during its time slot, and so forth.

In order to be able to precisely start immediately after the previous SA, in preferred embodiments of the present invention, an SA may watch (monitor) the carrier of the preceding SA. The SA will preferably start this monitoring process some time ($T_{scd}$) before the end of the time slot for the previously scheduled SA to allow for clock mismatches between the prior and current SA. This monitoring process may be a time-domain filter where the energy of the transmitting signal must drop below a threshold, denoted $E_{cdt}$. If an SA does not see a signal of energy greater than $E_{cdt}$, it is free to execute out of order. In some embodiments of the present invention a more complex message (or a token) may be sent from one SA to the next SA to indicate that the first SA is relinquishing its time slot, and possibly to carry any related data from one SA to the next.

In some embodiments of the present invention, SAs may communicate with each other wirelessly, in some cases using the same radio hardware that is normally used to communicate with RFID tags. Scheduling information may be interleaved with RFID tag communication.

Frequency Hopping

In order for an $SA_C$ to know when a preceding $SA_P$ is done reading, $SA_C$ may need to know the frequency on which $SA_P$ is operating. This is true if $SA_C$ contains a narrowband receiver that is only sensitive to transmissions over a certain range of frequencies. This may not be necessary if $SA_C$ contains a wideband receiver that can receive transmissions from $SA_P$ regardless of its frequency of operation. For performance, interference avoidance, and/or regulatory reasons, $SA_p$ may hop between a number of frequencies. This invention provides a number of strategies for dealing with frequency hops. The choice of strategy to be employed may depend on the radio regulations or interference mitigation strategy that is in force.

Pseudo Random List Length>>the Number of Channels Nc.

In some embodiments of the present invention, the frequency hop information may be shared among SAs via a pseudo-random seed $S_0$. This would be applicable, e.g., if the entire system was certified as a single unit. Each antenna employs a pseudo-random number generator which will select one of the $N_c$ channels of the system (by FCC part 15.247 regulations presently in effect, $N_c$ may be at least fifty). This pseudo random number generator will preferably be a $L_k$-bit LFSR (Linear Feedback Shift Register), where $(2^{L_k}-1) \times T_{cd}$ is long compared to any general operation time (for example, a sequence with a repeat length of hours to days). The value of $L_k$ could therefore be chosen to be between 16 and 32 bits to ensure a long repeat length. Each 1-bit section (where $2^l - 1 \geq N_c$) of the binary stream would be chosen and mapped onto the frequency hop table. If a sequence extends beyond the channel vector, that index will be skipped in favor of the next element in the list. The seed $S_0$ will be chosen as the original seed of the sequence. There are two types of operators on this state machine: a shift operator $O_s$ and an insert operator $O_i$. The global system of SAs and concentrators shares the state of the LFSR state machine at all time as it is operated on. Shift operators $O_s$ are executed on each time slice boundary implicitly by the system, while an insert operator (also simply a shift) can be executed at any time.

Pseudo Random List Length Equal to the Number of Channels.

In some embodiments of the present invention, each SA has a fixed, pre-generated pseudo random table. In these embodiments there may only be a single shift operator $O_s$ or both a shift and insert operator ($O_s$ and $O_i$), if it is important for SAs to not repeat channels consecutively, or to simplify this hop tracking operation. Here, the startSeed number is simply an index into the frequency hop table. This may have regulatory benefit if each SA is separately certified.

Out of Time Hopping

One set of issues surrounds the issue of loss of the carrier (loss of pseudo random synchronization) from the previous antenna if a frequency hop occurs. A frequency hop can occur, e.g., if an inventory process was complete and more time was allotted for further searching or the search time $t_{i-1}$ was longer than the channel dwell time ($T_{cd}$). This invention provides a number of strategies for addressing this issue:

No a Priori Network Tracking Information.

With this strategy, the SAs have a baseband sampling bandwidth of $W_s$Hz, which is region and hardware specific. For a region bandwidth $W_r$, [$W_r/W_s$] instances of making $N_{fts}$ samples are be taken, followed by an FFT (Fast Fourier Transform) and then peak finding. Using the FFT frequency bin from which the peak was found, the SA can determine if another SA is present on a given hopping frequency given by the FFT bin number. Note, however, that for multiple readers or in a dense environment, this algorithm may become confused due to the problems of hidden transmitters and multiple reader transmissions occurring within the receiver bandwidth.

A Priori Network Information with No Tracking

Some preferred embodiments of the present invention use more information that is known about the system than in the strategy described above. The ith antenna should go to the next channel (pseudo-random system or list index) after it does not receive a signal for some time $T_{cw}$ (which should be greater than the longest RFID protocol bit time $T_{rfb}$), or after its own estimate of the time $T_{cd}$ has expired. The $(i-1)^{st}$ antenna should send to the concentrator (or broadcast via multicast) an $O_i$ operation that a hop occurred before $T_{cd}$ so that other SAs have a network channel for checking the hop LFSR sequence position. This message should contain the entire LFSR shift register state vector so that the state of the LFSR sequence generator is completely known. The SA checks its incoming network queue for a message containing the insert and state machine information.

A Priori Network Information with Tracking

Where the pseudo-random list has length equal to the number of channels, the sampling algorithm specified above will work for tracking without having to check the network state. In the case of a large pseudo-random sequence, a simple RF SA-to-SA protocol would be needed. The modulation could be of any type, for example amplitude shift keying (ASK) which is chosen so that these messages do not adversely affect tag operation. The data sent is a message that contained, for example, the following information:

[PREAMBLE][GROUP ID][PARITY BIT(s)][PSEUDO STATE][PARITY BIT(s)][optional message check value]

The PREAMBLE is to establish bit timing and frame synchronization if needed.

Bit timing will not likely be an issue if the baseband processor clock precision is in the hundreds of ppm range. The GROUP ID and following parity bit define the group id. The PSEUDO STATE and following parity bit define the full state of the LFSR state machine. The bit time should be chosen such that the time to receive and decode this message is short compared to a read or inventory process.

Figure 3:
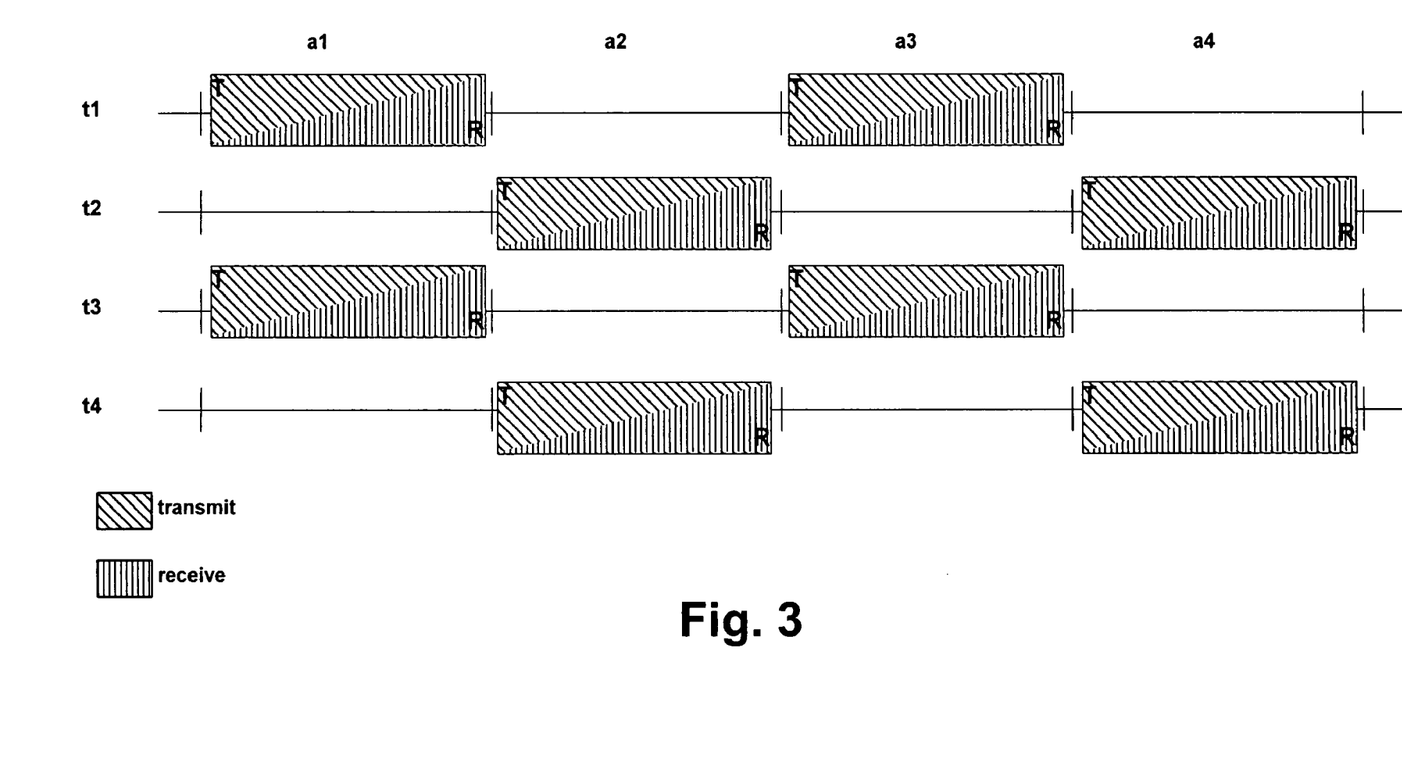

As noted above, if an SA does not see a signal of energy greater than $E_{cdt}$, it is free to execute out of order. This corresponds to a LFSR sequence insert operation $O_i$. This type of execution is important if a concentrator is operating on a large number of SAs. If this can be determined a priori, a separate reader group ID should be created and the groups can run out of order and unsynchronized from the RF perspective, but are synchronized in time via the network and the concentrator. Both of these scenarios are shown in FIG. 3 which shows scheduling according to embodiments of the present invention in which an antenna can begin transmission out of order if it does not conflict with another antenna and result in little loss of performance. By the reciprocity theorem, this matrix is always symmetric.

Other Antennas/Rogue Systems

Where there are other systems which may be fixed spatio-temporally relative to other systems or ephemerally spatio-temporally located (such a fork lift or handheld reader), the group ID in the RF channel and a similar network broadcast on the same subnet can be used to assign business rule-based priorities to operation. For example all fixed SAs could be assigned the same sub-group ID with the provision of a rule such that if a mobile (or roaming) SA with a sub-group ID whose number is not equal to it (e.g., forklift or handheld) comes into the field, the fixed SA becomes silent automatically to accommodate the mobile SA for a certain period of time, or until the centralized system determines that the fixed SA should resume wave use of the spectrum. Readers within the same sub-group ID are allowed to interact. Business rules may be assigned to signals coming from other systems (listen before talk, ignore, etc.).

MISO—Central Network Coordination with RF Carrier and Tag Synchronization for Decoding Currently the operation of encoding and decoding of tags at a SA is performed on a single reader basis. That is, to read a tag, a single reader must initiate a transmit sequence to a certain tag or group of tags that is synchronous with a response from those tag(s). If instead an SA (or a set or group of SAs) can frequency and phase-synchronize their AFEs to the transmitted RF carrier from another SA, then the entire set of synchronous SAs may attempt to decode the same tag that the main SA would decode. Passive RFID (Type I and II) tags are currently transmit-limited, meaning the SNR (signal-to-noise ratio) of the received signal from the tags to the SA has sufficiently low BER (Bit Error Rate) for adequate reception of the tag's response at the threshold where the tag is just barely powered. In this case the MISO technique will likely offer no benefit since this tag should be decodable from the originating antenna. However, there are a number of scenarios where this may not be strictly true and where a MISO method may offer certain advantages.

Confirmation.

Figure 4:
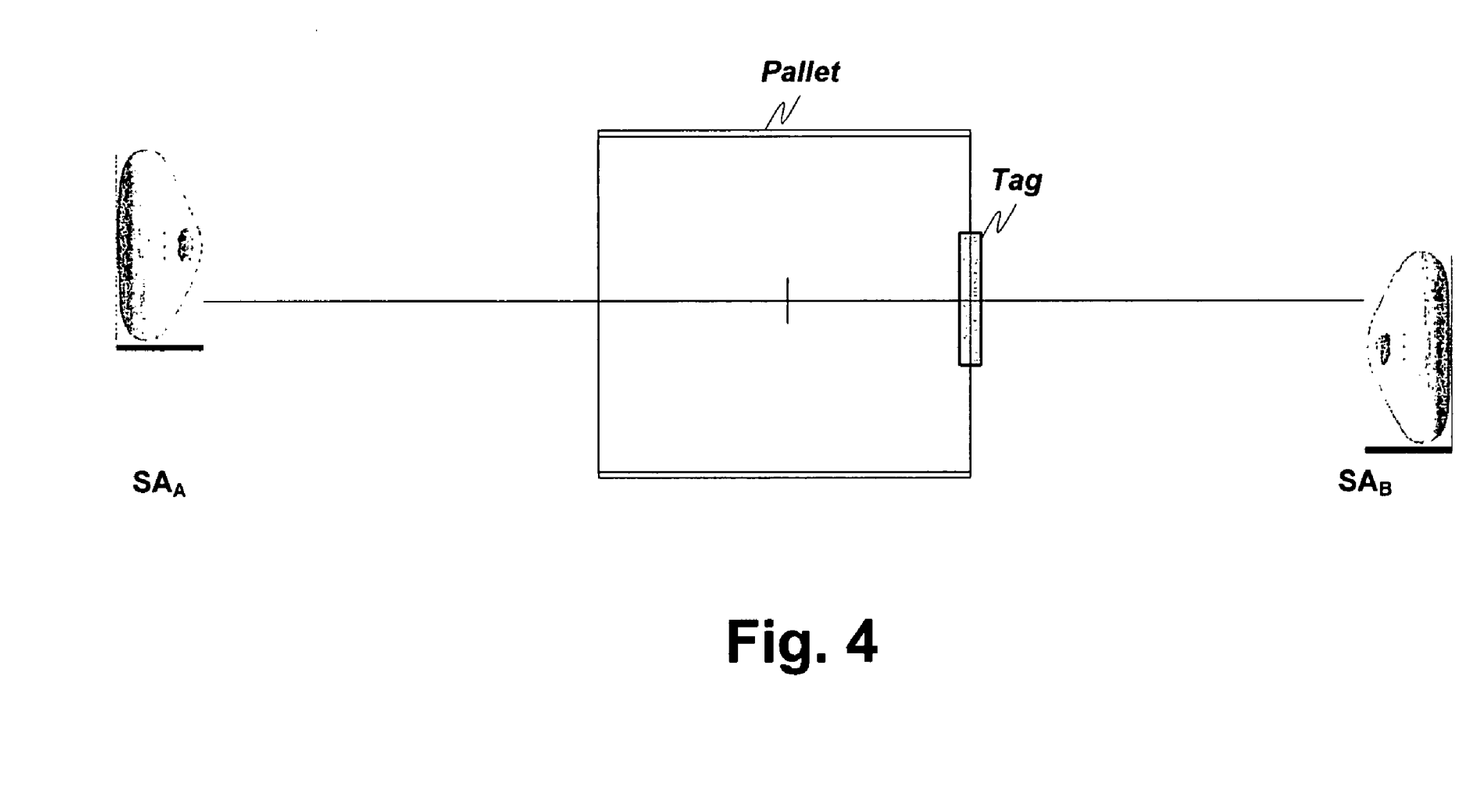
FIGS. 4-5 depict the operation of RFID readers according to embodiments of the present invention.

Even in conditions of apparently high SNR on the tag-to-reader link, for some protocols other errors may contribute to higher BERs, for example timing errors where the received signal is strong but not sent with the expected timing due to unexpected drift of the tag's onboard clock oscillator. Or alternatively, an external noise source may affect reception at a first SA more than at other SAs. Using another set of SAs to decode a bit stream could provide further confirmation of this condition, or even a successful data decode if the additional SAs are in receipt of a higher quality signal. Consider the schematic representation of two SAs and a pallet of goods with a single tag on one end shown in FIG. 4. In FIG. 4, the $SA_A$ on the left is transmitting and receiving, while the $SA_B$ on the right is receiving only during a time slot T. For semi-passive tags (or for passive tags operating near the transmit limit), the MISO approach should yield a lower bit error rate (BER). From the perspective of antenna $SA_A$, if the tag shown is powered, then it should be decodable with some BER. The SA on the right ($SA_B$) has a higher SNR than $SA_A$ due to factors such as lower external interference at the particular location of $SA_B$. The response of the tag does not have to pass through a radio signal path including the pallet of goods that may cause phase or amplitude changes leading to constructive or destructive interference at any given location. Additionally, a tag antenna design which is anisotropic (exhibiting an antenna gain greater than one) such that the tag does not backscatter isotropically may produce higher SNR at certain SA orientations which do not necessarily correlate with the originating SA.

Jammers

Figure 5:
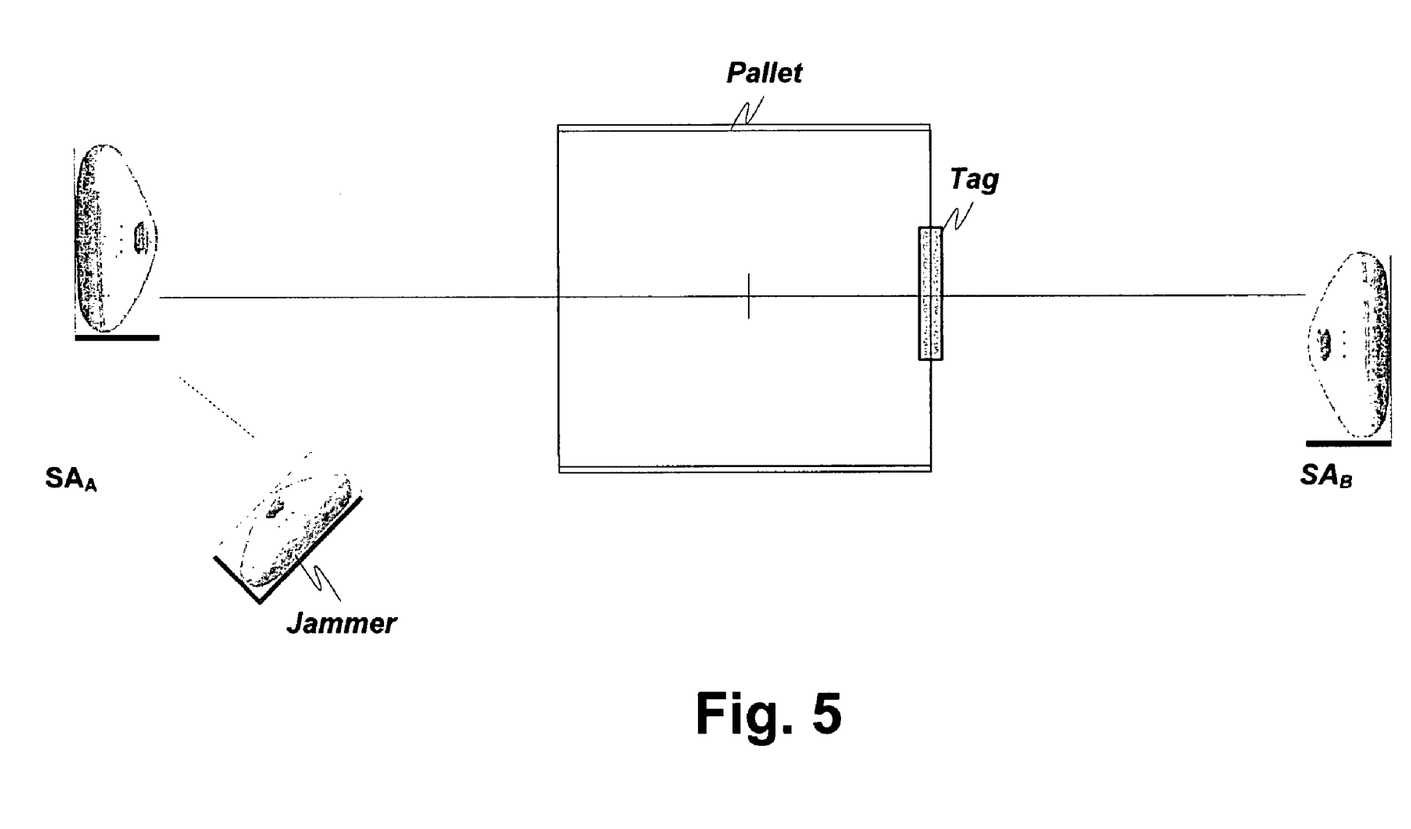

FIG. 5 shows the same scenario as FIG. 4, with a jammer on $SA_A$. Depending on the location of the jammer, $SA_B$ may have better decodability of the tag data than does $SA_A$. As shown in FIG. 5, the $SA_A$ on the left is transmitting and receiving, while the $SA_B$ on the right is receiving only during a time slot T. In this example, the presence of the jammer preferentially affecting $SA_A$ may prevent proper decidability of the tag at $SA_A$, while $SA_B$ should have a higher probability of success.

Semi-Passive Tags.

With semi-passive (battery powered) tags, there is no transmit limit as there is in the case of passive tags, so the MISO approach should improve the overall success of the system. In the case of semi-passive tags, path losses can be very large at long reader-to-tag distances, and MISO is thus a valuable approach in cases where there is another SA with a better reception path to the semi-passive tag than the SA that is transmitting. As tags improve in the transmit limited application (i.e., as less power is required to power them), then, if they become receive limited, the BER will definitely be important and be improved by MISO techniques.

To be synchronized to another SA, a SA should synchronize to three time-bases:

SA Local Oscillator (PLL) frequency. The worst case variability in the SA local oscillator frequency over a response from the tag should be known. This may be estimated by second and subsequent SAs from the CW preamble of the communication to the tags sent by the first SA. The second and subsequent SAs can then either phase lock their local oscillators to the first ("master") SA, or they can determine the offset between their local oscillator and the master's local oscillator and apply an estimation algorithm to compensate for this offset as part of the decoding process.

Baseband encoder clock. This time can be calibrated from the tag timing calibration loop which is sent from the reader to the tags.

Tag clock. This should be built into the decoder for a tag protocol.

Figure 6:
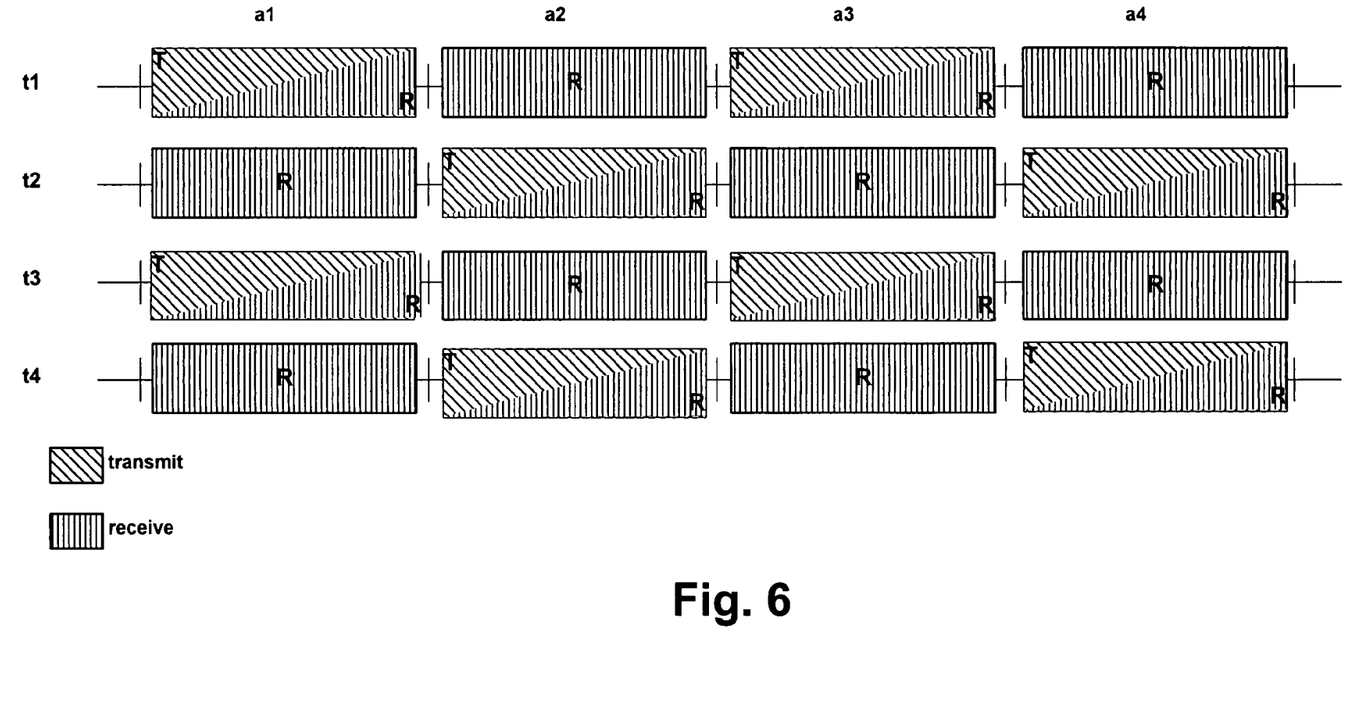

MIMO (Multiple Input Multiple Output)—Central Network Coordination with RF Carrier and Tag Synchronization for Encoding and Decoding FIG. 6 shows a schedule according to an embodiment of the present invention in which all receivers can execute out of sequence order to maximize read count. This approach will likely offer the most improvement over the systems of prior art.

Calibration

Some of the scheduling approaches and mechanisms described herein require that SAs have some radio transmission path information about other SAs. This information may be obtained by a calibration procedure described here.

In a simple system with a small number of readers, an operator may be able to predict which readers will likely interfere with each other. For example, if a dock door has readers on its left and right sides, those readers are likely to interfere and should not generally be on at the same time. But in complex system deployments, involving high reader densities, potential interference between SAs may be difficult to predict (which could lead to the system being scheduled in an overly conservative manner).

Accordingly, in some embodiments of the present invention, initially the devices may run a calibration phase to determine what levels of interference may exist between cooperating SAs, which in turn determines the schedules, frequencies, and power levels on which the antennas will start to transmit. In some embodiments of the present invention, once the static (fixed) antennas are in place, each antenna is turned on (one at a time) (in read mode), and the other antennas then determine certain characteristics of the signal from the reading antenna. This is essentially a pair-wise, brute force approach that allows each SA to determine the transmission path characteristics from of every other reader. In particular, during the calibration phase, each reader is given a turn being an active reader, and each other reader attempts to determine the signal strength of the active reader. This process is repeated until every antenna has knows the signal strength of every other antenna's read signal. In this manner a correlation matrix may be built to decide which antennas may be (or should not be) on at the same time. Antennas may thus be grouped together for scheduling purpose. This calculation may be performed either locally in each SA or centrally in the concentrator device. For some or all devices (e.g., those that are close to the threshold), this expensive $O(N^2)$ operation may be updated at run-time to deal with changing conditions or improve the estimates or deal with borderline threshold cases.

Those skilled in the art will realize that the two SAs may operate at the same time if they will not unduly interfere with each other. That is, in general, two SAs may operate at the same if neither of them will suffer degraded performance by the operation of the other.

For example, suppose that there are six SAs, denoted $SA_1$, $SA_2$, ... $SA_6$, and from the calibration process it is determined that $SA_1$ and $SA_2$ and $SA_3$ interfere with each other, similarly $SA_4$, $SA_5$, and $SA_6$ interfere with each other. But none of $SA_1$ and $SA_2$ and $SA_3$ interfere with any of $SA_1$ and $SA_2$ and $SA_3$. In this case, the SAs may be divided into two (logical) groups $G_1=\{SA_1, SA_2, SA_3\}$ and $G_2=\{SA_4, SA_5, SA_6\}$. Since the SAs in group $G_1$ do not interfere with any of the SAs in group $G_2$, the two groups can be scheduled independently of each other. In particular, any SA in group $G_1$ can be on at the same time as any SA in group $G_2$. In this example, the antennas in each of the groups $G_1$ and $G_2$ may be scheduled according to any appropriate schedule for that group, including basic TDMA schedule.

Those skilled in the art will realize that, in an extreme case, every antenna will interfere with every other antenna, in which case each group will have only one member and the overall scheduling may need revert back to TDMA alone. However, in a large, dense, reader environment, it is likely that readers spaced far apart will not likely interfere. The calibration algorithm can be used to determine how to spatially group readers.

Note that the calibration does not generally account for antennas that are not fixed in place. E.g., a reader on a forklift can move about a facility, thereby constantly changing its affect on other readers. However, it may be desirable for fixed readers to have some information about the identity and/or signal strength of movable readers.

In addition to, or instead of, the above described calibration, a human operator could simply map the potential interfering readers and configure the system accordingly. E.g., a dock configuration might always prevent pairs of antennas pointing straight at each other from simultaneously reading.

Business/Operation Rules

The scheduling techniques and devices according to embodiments of the present invention may be used to create so-called business (or operation) rules for scheduling. For example, SAs may be grouped according to function and/or location, and the readers in a particular group may be scheduled according to certain rules. For instance, the readers at a certain location (e.g., a dock door) may have a rule associated with them to turn off whenever a mobile reader comes within range. In this manner, a reader on a forklift (or hand-held reader) may be used without interference. This rule may be applied to specific readers or to all readers in certain groups.

Some examples of groups of readers are:
readers that do not (unduly) interfere with each other;
readers associated with a certain material handling process or operation;
readers with certain capabilities (e.g., protocol capabilities); and
spatially proximate readers.

Those skilled in the art will realize that this list of reader groups is merely exemplary, and the invention is not limited to these example groups of readers.

The following are some examples of what rules may specify:
at least some (or all) readers in the group should turn off if a reader not in the group is detected
at least some (or all) readers in the group should reduce transmission power if a reader not in the group is detected
at least some (or all) readers in the group should change their operating frequency when a reader not in the group is detected
one or more communication protocols to be employed by readers in the group for communication with tags.

Those skilled in the art will realize that this list is merely exemplary, and the invention is not limited to these example rules. In addition, a rule may apply to more than one group and more than one rule may apply to a group.

In some embodiments of the present invention, a reader may be in more than one group (e.g., based on protocol capabilities, proximity and interference). In such cases, rules may need to account for the potential of a reader's being in multiple groups. Group identification to exercise business rules may be communicated over the network (wired or wireless) or using an AFE.

SUMMARY

This invention provides mechanisms to support scheduling of multiple RFID readers, even in a very dense environment (i.e., even when there are many readers present). Embodiments of the present invention use space division multiplexing as well as time division multiplexing. That is, multiple antennas may be running at the same time so long as they are (spatially) far enough apart.

The scheduling according to embodiments of the present invention may be network-based and RF-based. In some cases, a network (wireless, wired or both) may be used to provide a broad location-based schedule, with the RF-based system providing a finer (possibly dynamic) time resolution to the schedule.

In some aspects, this invention solves the problems associated with multiple RFID readers by providing scheduling support for readers so that the tag reading will be reliable in the presence of multiple readers.

In one aspect, embodiments of the present invention may operate as follows: a schedule is sent to each antenna. Each antenna runs for a fixed period of time, and then another antenna runs when the first antenna's RF transmission level drops below a certain level, and so on. In some embodiments, the antennae may look for a drop in RF during their unscheduled time, and if they do detect a drop in RF they may run out of turn anyway. Based on this level detection, the RF-off time (in which no tags can be read by any reader) can drop to several microseconds rather than 10 s of milliseconds that would exist given network time transfer errors, for example those provided by the network time protocol (NTP). (The NTP is described in "*Network Time Protocol (Version 3) Specification, Implementation and Analysis*" RFC-1305, the contents of which are incorporated herein by reference.) NTP usually takes three to four hours to settle down to sub-20 ms accuracy (depending on synchronization event intervals) which could pose problems in dynamic environments or immediately after power outages (a three-to-four hour settling time is generally unacceptable for most applications of this type of technology). Initially the SA devices may run a calibration phase to determine the inter-SA transmission path losses, thus informing what levels the antennas will start to broadcast. A correlation matrix is built to decide which antennas can be on at the same time.

In some embodiments of the present invention, SAs may obtain NTP information themselves (i.e., SAs are configured by the concentrator initially) and use their time slots on NTP or bounded by the change in RF power state from other readers.

An advantage of this method is that it allows multiple antennas to operate at the same time, and dynamically to deal with interfering antennas as they are set up. Little user intervention is thus needed to program the system, so the system is self adapting.

The received RF CW (Continuous Wave) signal from a certain SA or group of SAs may also be used as a distributed point-to-point clock as a basis for timing. In this case, the system may use one SA to send the signal and another to receive the signal (for instance, where something such as metal blocks the returned signal). In these cases the receiver will use the carrier of the received signal not the sent signal to allow synchronization of the received signal.

In the case where a so-called "rogue" antenna—an antenna which is not "on schedule"—enters an area, the antennas may shut down until the rogue antenna is turned off (or leaves or is no longer detected). (Note that a system may assign business logic to determine the appropriate course of action given such events). This could occur, e.g., with the use of a handheld reader or forklift truck with an antenna that entered the area. A protocol is provided that allows devices to communicate a group ID in order to allow such business rules to be assigned.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of operating a plurality of Radio Frequency Identification (RFID) readers in a group, the method comprising:
   determining, by each of the plurality of readers, transmission characteristics of each of the other readers during a calibration phase;
   generating, based on the determination, a spatial-division and time-division synchronization schedule for the plurality of readers in the group, the synchronization schedule specifying one or more scheduled turns for each reader to operate at a specific transmission power level, communication protocol and operating frequency, such that the plurality of readers do not unduly interfere with each other; and
   operating the plurality of readers according to the synchronization schedule, wherein a reader in a group may further operate out of its one or more scheduled turns if it determines that operation of a scheduled reader will not unduly interfere with its out-of-turn operation and the reader in the group changing a respective communication protocol when another reader not in the group is detected.

2. A method as in claim 1 wherein each reader may be associated with at least one reader group, and wherein the schedule specifies a duration of time that all of the readers in a group may be active, and wherein readers in different reader groups may be scheduled independent of readers in other reader groups.

3. A method as in claim 2 wherein the readers within a group operate according to a time division multiple access (TDMA) schedule.

4. A method as in claim 1 wherein the readers operate according to one of the following scheduling schemes:
   (a) central network coordination with no radio frequency (RF) synchronization; or
   (b) central network coordination with synchronization controlled at least in part by radio transmission; or
   (c) central network coordination with RF carrier, reader modulation and tag synchronization for reception; or
   (d) central network coordination with RF carrier, reader modulation and tag synchronization for transmission and reception.

5. A method as in claim 1 wherein scheduling information is transported via a network.

6. A method as in claim 1 wherein scheduling information is transported wirelessly.

7. A method as in claim 1 each reader may be associated with a reader group, and wherein the schedule specifies one or more communication protocols to be employed for communication with tags.

8. In a system in which a plurality of Radio Frequency Identification (RFID) readers in a group are operating, a method comprising:
   determining, by each of the plurality of readers, transmission characteristics of each of the other readers during a calibration phase;
   generating, based on the determination, a spatial-division and time-division synchronization schedule for the plurality of readers in the group, the synchronization schedule specifying one or more scheduled turns for each reader to operate at a specific transmission power level, communication protocol and operating frequency, such that the plurality of readers do not unduly interfere with each other;
   by the first reader of the plurality of RFID readers in the group, obtaining the schedule, the schedule specifying a time at which the first reader may operate; and
   the first reader operating out of turn if it determines that operation of a scheduled reader will not unduly interfere with its out-of-turn operation and the first reader changing a respective communication protocol when another reader not in the group is detected.

9. A method as in claim 8 further comprising:
   monitoring the scheduled reader; and
   determining whether an energy level of a signal from the scheduled reader drops below a certain threshold; and
   based at least in part on said determining, operating the first reader out of turn if it determines that operation of a scheduled reader will not unduly interfere with its out-of-turn operation if the energy level of the signal from the scheduled reader drops below the threshold.

10. A method as in claim 8 further comprising:
    receiving a message from the scheduled reader; and
    determining, based at least in part on the message, a likelihood of noninterference with the scheduled reader, and
    operating the first reader if it determines that operation of a scheduled reader will not unduly interfere with the first reader's operation.

11. A method of operating a plurality of Radio Frequency Identification (RFID) readers, the method comprising:
    identifying at least some of the readers for grouping into a group;
    assigning at least one rule to the group; and
    operating the readers in the group according to the at least one rule,
    wherein the at least one rule specifies that at least some readers in the group should reduce transmission power, change operating frequency or change communication protocol if a reader not in the group is detected such that operation of the reader not in the group and the readers in the group should not unduly interfere with each other, the method further comprising:
    changing a respective communication protocol of at least some readers in the group when a reader not in the group is detected.

12. A method as in claim 11 wherein the at least one rule specifies that at least some readers in the group should turn off if a reader not in the group is detected, the method further comprising:
    turning off all readers in the group when a reader not in the group is detected.

13. A method as in claim 11 wherein the grouping further comprises:
    determining a degree to which each of the plurality of readers interferes with each of the other of the plurality of readers;
    grouping readers based at least in part on said determining.

14. A method as in claim 13 wherein the grouping comprises:

grouping readers that do not interfere with each other into the same group.

15. A method as in claim 11 wherein the group comprises readers associated with a certain material handling process or operation.

16. A method as in claim 11 wherein the group comprises spatially proximate readers.

17. A method as in claim 11 further comprising:
scheduling readers in each group independent of readers in each other group.

18. A method as in claim 11 wherein readers within a group communicate with each other wirelessly.

19. A method as in claim 18 wherein scheduling information is interleaved with RFID tag communication.

20. A method as in claim 18 wherein readers within a group communicate with each other using the same radio hardware that is normally used to communicate with RFID tags.

21. A method as in claim 11, further comprising changing the operating frequency of at least some readers in the group when a reader not in the group is detected.

22. A method as in claim 11, further comprising changing the transmission power of at least some readers in the groups when a reader not in the groups is detected.

* * * * *

UNITED STATES PATENT AND TRADEMARK OFFICE
CERTIFICATE OF CORRECTION

PATENT NO.         : 7,898,391 B2
APPLICATION NO.    : 11/171443
DATED              : March 1, 2011
INVENTOR(S)        : Yael Gregory Maguire It is certified that error appears in the above-identified patent and that said Letters Patent is hereby corrected as shown below:

COLUMN 8, LINES 60-61

Replace the sentence:

But none of $SA_1$ and $SA_2$ and $SA_3$ interfere with any of $SA_1$ and $SA_2$ and $SA_3$.

with the following sentence:

But none of $SA_1$ and $SA_2$ and $SA_3$ interfere with any of $SA_4$ and $SA_5$ and $SA_6$.

Signed and Sealed this
Thirtieth Day of October, 2012

David J. Kappos
*Director of the United States Patent and Trademark Office*